United States Patent [19]

Mayer

[11] 4,050,359

[45] Sept. 27, 1977

[54] HYDRAULIC POWER TRIM AND POWER TILT SYSTEM SUPPLY

[75] Inventor: William B. Mayer, Oshkosh, Wis.

[73] Assignee: Brunswick Corporation, Skokie, Ill.

[21] Appl. No.: 687,383

[22] Filed: May 17, 1976

Related U.S. Application Data

[62] Division of Ser. No. 610,415, Sept. 4, 1975, Pat. No. 3,999,502.

[51] Int. Cl.[2] .............................. F01B 3/00; F16J 1/10

[52] U.S. Cl. .............................. 92/113; 91/422; 92/129; 92/143; 92/171

[58] Field of Search .................. 92/62, 169, 171, 113, 92/8, 129, 52, 143; 244/104 FP; 91/422

[56] References Cited

U.S. PATENT DOCUMENTS

| | | | |
|---|---|---|---|
| 2,186,266 | 1/1940 | Onions | 92/8 X |
| 2,679,827 | 6/1954 | Pardue | 92/51 X |
| 2,761,425 | 9/1956 | Bertsch et al. | 92/163 X |
| 2,858,802 | 11/1958 | Parsons et al. | 92/163 X |
| 2,893,209 | 7/1959 | Colley | 92/52 X |
| 3,426,651 | 2/1969 | Arendarski | 92/26 |
| 3,871,527 | 3/1975 | Schimmeyer et al. | 92/8 X |

*Primary Examiner*—Irwin C. Cohen

*Attorney, Agent, or Firm*—Andrus, Sceales, Starke & Sawall

[57] ABSTRACT

A hydraulic system for a combined power trim and shock absorbing piston-cylinder unit of an outboard motor includes a reversible pump means having a trim-up port connected by a pressure responsive pilot valve piston cylinder units and a trim-down port through a reverse lock solenoid valve and a down-pilot spool valve providing full drain flow for trim-up and power flow for trim-down. An "up-reverse" pilot valve with a pressure operator is in parallel with the reverse lock valve and provides a restricted by-pass for limited trim-up in reverse. The trim-up hydraulic input or powered side of the cylinder units define a trapped hydraulic system creating "memory" in the system so after impact the motor returns to the original trim position. The return side permits relatively free-flow to permit "trail-out" under low impact. At high speed impact, the flow is restricted and cylinder pressure increases. At a selected point, a shock valve within the piston-cylinder opens and absorbs the shock forces. The piston unit includes an inner floating head telescoped into a head secured to the piston rod with a chamber thereby formed to store the liquid flow during shock movement. A metered orifice and check valve allows return to the original trim-set position.

7 Claims, 5 Drawing Figures

HYDRAULIC POWER TRIM AND POWER TILT SYSTEM SUPPLY

This is a division of application, Ser. No. 610,415, filed Sept. 4, 1975, now U.S. Pat. No. 3,999,502.

BACKGROUND OF THE INVENTION

This invention relates to a hydraulic power trim and shock absorbing supply system for marine propulsion devices.

Outboard motors, stern drive units and the like employ a vertically tiltable lower propeller units which are adjustable trimmed relative to the boat and water. Generally, adjustable trimming means is required to compensate for various factors such as speed, loading, water conditions and the like. Proper trimming is desirable in order to obtain maximum speed operation while maintaining safe propulsion conditions. As various factors may vary when underway, this system desirably provides for adjustment of the trim while moving.

Generally, the support and lower units are provided with piston-cylinder units connected to a suitably pressurized fluid supply for trim adjustment. Additionally, hydraulic shock absorbing and energy dissipating piston-cylinder units are employed to permit tilt of the lower unit in response to striking of an underwater obstacle and the like without damage to the boat or motor. Further for trailering and maintenance, the propulsion device is tilted upwardly to a clearance position. Various systems have been suggested employing separate trim position units and shock absorbing units.

Generally, known functioning units include suitable shock valve means connected in the system to compensate for timed energy forces under impact. For example, an energy absorbing relief valve means may be provided in the pump unit. Because of the large forces and pressures encountered, however, the size, shape, and structure of the hydraulic lines and connections become critical. The hydraulic system normally includes flexible lines or hoses for convenient interconnection of an inboard reservoir and pump means to the hydraulic actuator. Such lines are inherently subject to expansion and contraction under the required high pressures which may adversely affect the system operation. In addition, very large high strength lines are required. A highly desirable system employs a dual acting piston-cylinder unit for trim positioning, trailering positioning, and shock absorbing. The use of a combined shock absorbing and a trim positioning cylinder unit minimizes the number of components thereby minimizing the hardwar and undesirable asethetics associated with the multiple component systems. An extremely satisfactory system is disclosed in Applicant's copending application entitled "HYDRAULIC POWERED TRIM AND TILT APPARATUS FOR MARINE PROPULSION DEVICES"chich was filed on the same date as this application and is assigned to a common assignee herewith. As more fully disclosed in such application, the combined trim, tilt, and shock absorbing means is provided mounted within the bracket assembly for aesthetic purposes and also to protect the components and particularly the hydraulic connections.

In the prior art systems, it is also possible that the velocity at impact will not be great enough to release the delicate absorbing system because it is below the break-loose level. However, the impact may be sufficient to, at least temporarily, stop the boat; with the possibility of danger to the passengers as a result of being thrown forward and the like.

The trim system is also preferably provided with a "trail-out" circuit which permits the unit to ride over obstructions at low speeds and also permits manual tilting of the lower unit.

Further, with impacting and energy absorbing devices, in combination with the variable trim control, the motor should preferably automatically return to the previously established trim position. This of course requires that a "memory" be introduced into the system.

In order to permit the various functions under optimum conditions relatively complicated hydraulic systems and multiple cylinder arrangements have been generally employed.

SUMMARY OF THE PRESENT INVENTION

The present invention is particularly directed to a hydraulic system for operating of a combined power trim and shock absorbing piston-cylinder unit for the tilting of the lower unit of a marine propulsion means, such as an outboard motor, a stern drive unit and the like which provides a reliable, long life protection and allowing rapid and accurate positioning of the lower units. The hydraulic supply apparatus of the present invention provides a highly favorable trail-out construction which permits movement of the propeller unit over obstructions at low speeds in a forward direction as well as addditional mechanisms permitting convenient manual tilting. Further, in accordance with a preferred and novel construction the apparatus is constructed and connected to introduce "memory" into the system such that after tilting either because of "trail-out" manual tilt or high speed impact tilting, the propulsion unit, returns to the previously set trim position.

More particularly, in accordance with the present invention, the trim and shock absorbing operator means is powered up and down from a pressurized reversible hydraulic source such as the conventional reversible pump. The source provides a trim-up port at one side and a trim-down port to the opposite side. The trim-up port is connected by a pressure responsive pilot valve means to the trim-up side of the trim and shock absorbing means to expand the unit and thereby effect the trim-up positioning. The opposite side or trim-down powered of the means is connected to return the fluid therefrom through a trim-down line including a reverse lock valve means, which is preferably an electrically operated normally open valve means providing a reverse lock functioning, and a down-pilot valve means to the supply or trim-down port of the source. The down-pilot valve means is preferably a spool type providing full flow under trim-up conditions and responsive to an increasing pressure at the trim-down side of the source to close the trim-up return path and pressurize the trim-down side of operation means through the reverse lock valve means. This provides for a full flow return path in the trim-up path and thereby avoiding the adverse effect of restrictions. With the source means establishing a trim-down output, the pilot valve means in the trim-up side of the source is actuated to positively hold the associated valve means open thereby permitting draining and return of hydraulic fluid from the opposite or trim-up side of the operator means and preventing a hydraulic lock of the operator means.

In accordance with a particular aspect of the present invention, an "up-reverse" pilot valve means having a pressure operator is connected in parallel with the reverse lock valve means. The operator is connected to the trim-up port of the source. In a trim-up mode, the "up-reverse" pilot valve means is therefore positively held open and provides a by-pass path around the reverse lock valve means which closes when in reverse gear. The valve means introduces a restriction in the flow path, thereby reducing the effective pressure applied to raise the trim and shock absorbing operator means to prevent full trim-up. When running in reverse the reverse lock valve means is closed. The pump circuit is also positively held open to positively prevent operation of the pump and thereby preventing trim-up while running in reverse.

The apparatus also provides for automatic trail-over at low speed impact movement of the lower unit by the maintaining of the return path essentially unrestricted in forward gear or neutral. However, the trim-up hydraulic side of the operator means is effectively sealed. Although the operator moves such as the expansion of a piston-cylinder unit to allow the movement of lower unit over the low impact load, hydraulic liquid is not drawn into the system on the trim-up side of the piston-cylinder unit. Consequently, after the device riding over the load, the lower unit automatically returns to the initial trim set position, thus effecting a "memory" response. At high speed impact the flow system essentially is that described for slow impact. However, the return flow will not permit the complete free movement and consequently the cylinder pressure increases and at a selected point opens shock valves within the system and particularly within the piston assembly which absorbs the forces and prevents kicking or rapid movement of the lower unit. After high speed impact, a metered orifice and check valve means allows return to the original trim-set position as a result of the desirable memory feature.

The hydraulic supply system of the present invention as applied to a combined trim and shock absorbing cylinder unit therefore produces a highly accurate and positive control, permitting the lower unit to tilt or move upwardly under relatively safe conditions and automatically returning to the desired trim position while also permitting the high speed impact compensation essential to safe motor boating and the like. The trimming can be readily effected while under forward running conditions and to a limited degree in non-running reverse gear position. Further, the hydraulic supply system does not require any complicated control structures or the like and can be conveniently and economically manufactured while maintaining or while providing reliable operation over a long operating life.

BRIEF DESCRIPTION OF THE DRAWINGS

The drawings furnished herewith illustrate a preferred construction of the present invention in which the above advantages and features are clearly disclosed as well as others which will be readily understood from the following description.

In the drawings.

DESCRIPTION OF THE ILLUSTRATED EMBODIMENT

Figure 1:
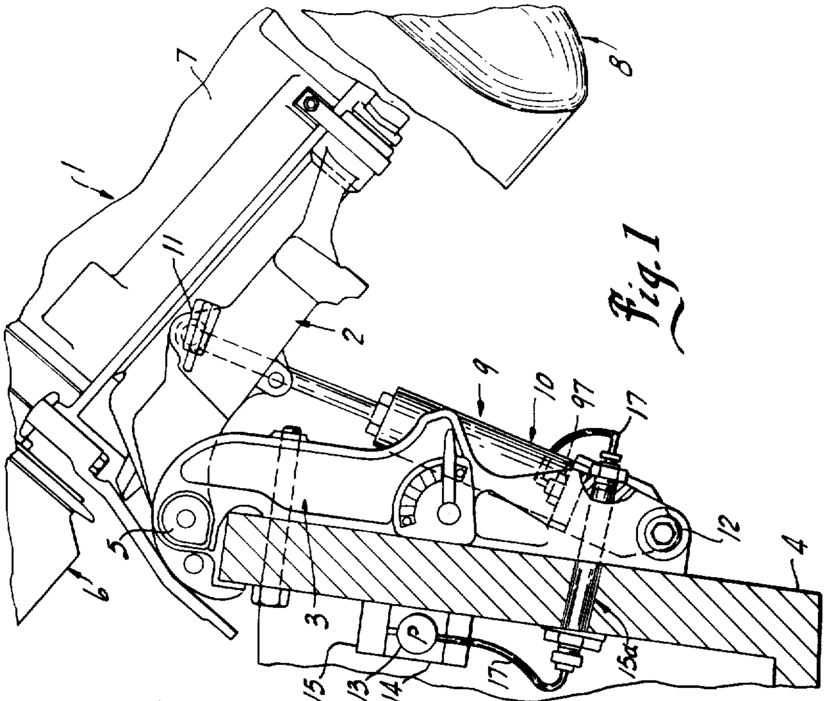
FIG. 1 is a fragmentary elevational side view of an outboard motor assembly illustrating a system employing the present invention.

Referring particularly to FIG. 1, a fragmentary portion of an outboard motor drive apparatus is shown to illustrate and explain a preferred embodiment of the present invention. The outboard motor apparatus generally includes an outboard motor 1 having a swivel bracket 2 pivotally attached to a transom bracket assembly 3 mounted to a transom 4 of a boat, not otherwise shown. Conventionally, swivel bracket 2 is pivotally mounted to a transom bracket on a horizontally located tilt tube or pin 5 and includes a suitable vertical pivot support for the outboard motor 1 permimitting steering movement of the outboard motor in accordance with conventional practice. A powerhead 6 is secured to the upper end of drive shaft housing 7 with a lower propeller unit 8 is secured to the lower housing end. A dual function powered trim and shock absorbing piston-cylinder assembly 9 is shown mounted within the swivel and transom bracket assemblies. The illustrated swivel bracket in the power cylinder assembly is similar to that disclosed in Applicatant's previously identified copending application and, as any suitable system can be employed, the assembly is only generally described to clearly describe the embodiment of the present invention. The assembly 9 includes a pair of piston-cylinder units 10 which are located in side-by-side relation and pivotally interconnected at the upper end to the swivel bracket 2 as at 11 and at the lower end to the transom bracket 3 as at 12.

Piston-cylinder units 10 are connected to a suitable pressurized hydraulic source which is conventionally a constant displacement reversible pump means 13 and reservoir 14 located within the boat, with an interconnecting valve and control means 15 also located within the boat and connecting the output of the pump means 13 to suitable connecting hydraulic hose to the units 10. As more fully disclosed and previously identified in the above application, the hose system preferably provides for connection through the transom bracket mounting bolts 15*a* to the lower ends of the cylinder units 10, which includes internal passageways to the opposite ends of the cylinder unit 10.

Figure 3:
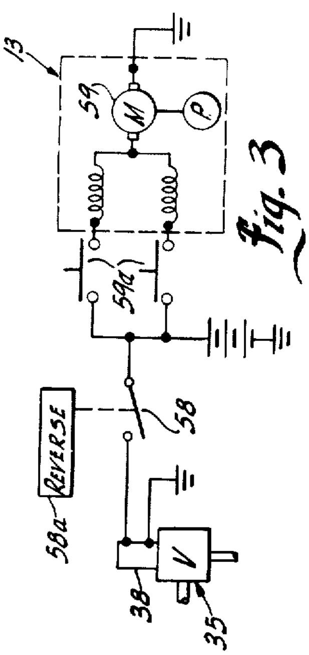
FIG. 3 is a schematic view of a suitable electrical control system for the outboard motor and the hydraulic system of FIGS. 1 and 2.
Figure 2:
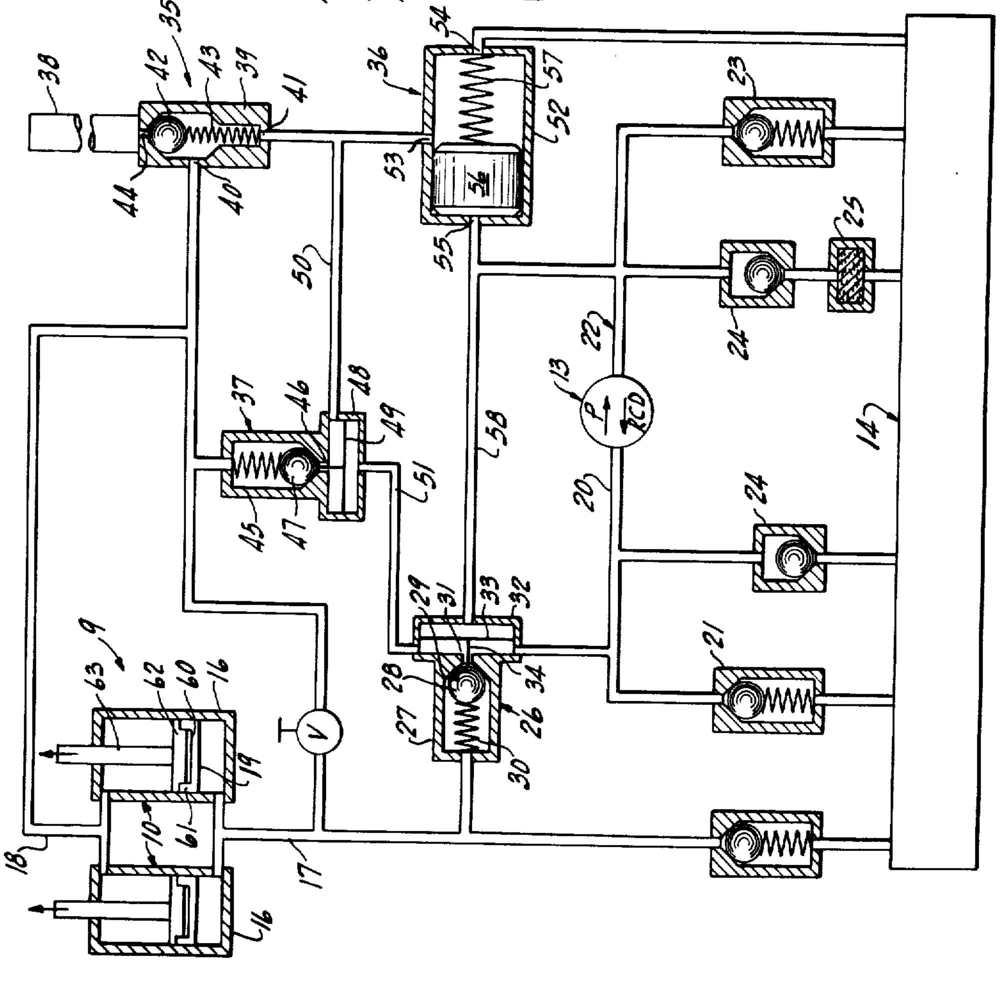
FIG. 2 is a schematic flow diagram of a hydraulic system constructed in accordance with the teaching of the present invention for the outboard motor power trim assembly of FIG. 1.

The present invention is particularly directed to an improved hydraulic supply and control system for proper directing of the pressurized fluid to and from the piston-cylinder units and a preferred embodiment of the present invention is schematically shown in the hydraulic and electric diagrams of FIGS. 2 and 3.

Referring particularly to FIG. 2, the pair of piston-cylinder units 10 are diagrammatically illustrated including similar cylinders 16 having a piston end connected in parallel to a trim-up line 17 and the piston rod side of the cylinders similarly connected to a trim-down line 18. Piston units 19 are mounted in each cylinder 16 and move upwardly and downwardly in response to pressure at lines 17 and 18, respectively. The respective lines 17-18 of course function as return or drain paths when not pressurized. The lines 17-18 are particularly connected through a novel valving system to the constant displacement reversible pump 13 as the source of pressurized fluid. The trim-up port 20 of pump 13 is coupled to the reservoir 14 through a relatively high pressure regulating valve 21, shown as a spring loaded check valve, and the trim-down side or port 22 is similarly connected through a relatively low pressure regulating valve 23. The trim-up pressure may, for example, be set to a maximum on the order of 31 psi while the down side may be limited to 1200 psi. In addition, free floating check valves 24 are connected between the opposite sides of the pump 13 and reservoir 14, with a filter 25 shown between the trim-down check valve 24 and the reservoir 14.

The pump trim-up port 20 is connected to the trim-up line 17 of the piston cylinde units 10 by a pilot operator pressure regulating valve unit 26, diagrammatically shown as a piston operated check valve assembly. The valve unit 26 is illustrated as including a valve housing 27 with check valve ball 28 movable into engagement with an upstream valve seat 29. Preferably a soft seat valve is used in place of the illustrated ball check valve. A spring 30 resiliently holds the ball 28 in engagement with the valve seat 29, and is set to open at a relatively low pressure on the order of 50 psi. The valve seat 29 includes an inlet passageway 31 connected to the trim-up line 20 which opens the valve to transmit pressure to the trim-up line 17. The valve unit 26 further includes a pressure responsive operator shown as a piston-cylinder type with a chamber 32 secured to the upstream side of the ball check valve housing 27 and wi'h a piston or plunger 33 slidably mounted therein. A piston rod 34 extends into the valve inlet passageway 31 for selective engagement with the check ball 28. The pump port 20 is coupled to the operator chamber 32 to the piston rod side of the piston 33. Thus, when the pump 13 is operated to pressurize the trim-up port 20, piston 33 is withdrawn and transmits full pressure to and through valve 26. The units 10 are then powered to trim-up the outboard motor lower unit by forcing of the piston 19 outwardly of the piston cylinders 16. The fluid to the piston rod side of such units 10 is returned through trim-down line 18 which is returned to the reservoir 14 as follows.

A reverse lock valve means 35 is connected to the trim-down line 18. The valve means 35 is normally open, permitting essentially free and unrestricted flow from the piston cylinder units 10. A similar normally open down pilot valve means 36 is connected between the valve means 35 and the reservoir 14. Consequently, during the trim-up mode of operation, a free-flow return path is provided to the reservoir 14 to allow rapid and unrestricted trim-up. In accordance with the illustrated embodiment of the invention, a novel pilot valve means 37 is provided to permit trim-up of the lower unit in reverse gear when the reverse lock valve means is actuated to close the free-flow passageway.

More particularly, the reverse lock valve means 35 is diagrammatically illustrated as a solenoid operated check valve having an operating solenoid 38. The valve means 35 is shown with a valve chamber 39 with a side inlet 40 connected to the trim-down line 18 and an end port 41 connected to the reservoir through the "down" pilot pressure valve means 36. A check ball 42, which may also be a soft seat valve, is held in spaced relation to port 41 by a spring 43 which allows free flow from line 18 through port 41 and the reservoir 14. Energizing of the solenoid 38 actuates a plunger 44 to positively move the ball 42 downwardly into engagement with the seat of port 41 thereby closing the port and preventing the flow from the intermediate port 40 which is connected to line 18.

In this position, the fluid can therefore only return through the pilot valve means 37.

The pilot valve means 37, which may also be a soft seat valve, is shown as a spring loaded check valve assembly having a pressure responsive operator similar to valve means 26 in the trim-up path to the piston cylinder units 10. Thus, valve means 37 includes a check ball valve 45 having an inlet port connected to line 18 and an outlet port 46 resiliently closed by a ball check 47. The pilot valve means 37 also includes a cylinder operator 48 having a central piston 49 operable to move the ball check 47 to open the valve means 37. The valve opening 46 is connected by a by-pass line 50 to the common connection between the reverse lock valve means and the down pilot pressure valve means 36. This then provides a restricted by-pass. The operator 49 has the piston side connected by a control signal line 51 to the trim-up port 20 of the pump 13 in the illustrated embodiment, in series with the valve means 26. Thus, with the pump 13 operating to pressurize the trim-up port 20, the pilot check valve means 37 is also pressurized and will positively hold the valve open and maintain the restricted flow path through orifice 46, in parallel with the closed reverse lock solenoid means 35.

Under normal forward power trim-up operation, the reverse lock solenoid is open and consequently the valve means 37 does not affect the operation of the trim-up circuit. However, when the engine is placed in reverse gear, and the reverse lock solenoid valve means is energized and positively held closed, the restricted by-pass as just described permits trimp-up.

When running in reverse gear, the thrust of the lower unit is applied in the direction to trim-up. However, the reverse lock solenoid valve means 35 is now positively closed. Trim-up by actuation of the pump 13 can occur with return flow occurring through valve means 37. Tilting up movement of the engine is prevented by the action of the pilot check valve means when the pump 13 is inactivated.

Trim-down is affected by reverse running of the pump 13 to pressurize the trim-down port and line 20 with the following operation. The trim-down line 20 is connected to the "down" pilot pressure valve means 36 which is diagrammatically illustrated as a spool-type valve having a cylindrical valve chamber 52. An intermediate common port 53 is connected to the reverse lock valve means 35. The return port 54 for trim-up operation is connected to one end of the spool valve chamber 52 while a trim-down port 55 is connected directly to the opposite end and is also connected to pump line 22. A spool 56 is slidably mounted within the cylinder 52 with a spring 57 acting between the spool 56 and the trim-up port end to continuously bias the spool to close the trim-down port 55 and maintaining the unrestricted trim-up return flow.

When the pump 13 is operated in a reverse direction to pressurize the trim-down port 22 pressure builds within the corresponding end of chamber 52, causing the spool 56 to move against the force of the spring 57 and sequentially closing the common port connection to port 54 and then moving beyond such common port to open the connection to the trim-down port 55. The flow is from port 55 through valve 36 and then through the reverse lock valve means 35 and pilot valve means 37 in parallel to trim-down line 18, biasing the cylinder units 10 trim-down by moving of pistons 19 downwardly.

This requires the liquid on the piston side of units 10 to flow out to line 17, which is in the direction to set the ball check 28 to close valve 26. The trim-down port 22 is also connected however via a coupling line 58 to the operator chamber 32 of valve means 26. Pressure in port 22 moves piston 33 and rod 34 to positively hold valve 26 open.

Thus, the trim-down line 18 to the piston-cylinder units 10 is pressurized and the piston-cylinder units 10 are actuated to move the pistons 19 and piston rods downardly, as shown in FIG. 2, to trim-down with the fluid to the opposite side of the pistons 19 returning to the low pressure side of the pump 13 via the trim-up line 17.

Trimming down in reverse gear will occur in the same manner. In the reverse gear, however, the reverse lock solenoid valve means 35 is closed. This valve is preferably a soft seat seal type valve such that as the pressure rises, limited reverse flow is permitted to the trim-down line 18. Thus, on the trim-down while in reverse gear, the output of pump 13 must increase sufficiently to move the "down" pilot pressure valve, the reverse lock valve pressure and the pressure necessary to move the trim cylinder unit against the reverse thrust. The "down" pilot pressure valve 36 is set to require a pressure in excess of 300 psi to insure the opening of the valve unit 26 prior to pressurizing of the trim-down line 18. The spool valve unit 36 when shifted to pressurize line 18 establishes an unrestrictd flow and maintains full pump pressure in line 18. Normally, the total pressure must reach 300 to 600 psi in the reverse output and as previously noted, the pump is capable of producing 1200 psi.

As shown in FIG. 3, the reverse lock solenoid 38 of valve 35 is connected in series with a reverse lock switch means 58 which is coupled to the reverse gear unit 58*a* of the motor, the battery supply is connected to switch means 58 in parallel with the trim otor control. Thus, the pump is shown including a reversible D.C. motor 59 having forward and reverse widnings connected to the battery supply in series with corresponding control siwtches 59*a*. The illustrated circuit is simplified for purposes of illustration. Thus, the system will normally provide various additional controls such as an up-limit tilt switch and the like.

In the forward gear or neutral position, the illustrated hydraulic system is such that the lower unit 8 may trail over an object or be manually lifted. Thus, with the boat moving forward and in forward gear or neutral, an inpact load applied to the lower unit 8 will mechanically cause the pistons 19 and attached piston rods to move in the up-direction. The fluid to the piston rod side of the piston cylinder 16 is free to move through trim-down line 18, the normally open reverse lock valve means 35 and the free flow "down" pilot pressure valve means 26 to the reservoir 14.

However, as the pistons 19 move, fluid does not enter to the opposite side of the hydraulic system and the fluid is trapped within the up-side such that the pistons 19 position remains relatively constant. Thus, valve means 26 is pressure regulated by spring 30 which is selected to prevent the valve from opening as a result of the "trail-out" or shock absorbing movement of the piston units 19. After trailing over, the lower unit 8 drops and automatically cause the pistons 19 to return to the previous trim-set position.

The unit will also similarly function under a high speed impact with respect to normal flow. However, a high speed impact load tends to create a substantial flow, the system restricts such flows and the cylinder pressure increases. The piston units 19 of the combined trim and shock absorber unit 10 are specially formed as a two piece assembly, as more fully described with respect to FIGS. 4 and 5, to define a reservoir 60 between a floating trim piston member 61 and a shock piston member 62 secured to the piston rod 63. The energy of the impact as seen by the shock rod 63, as it moves outwardly, is absorbed by the piston member 62 which includes a pair of shock valve units 64 and 65. The valved piston member 62 allows the shock forces to exist on the piston units 19 for a given length of time reacting to the force of the shock rod and resisting the rotating of motor. During the shock, hydraulic fluid is passed into the reservoir 60 via assembly 64. After the shock, the fluid is allowed to return through check valve assembly 65 in the opposite side of the piston. This allows the motor to return to its original trim position.

During this operation, however, the same trapped liquid condition is maintained on the opposite side of the trim piston 61 as a result of the pressure regulating valve means 26 and, consequently, the shock piston 62 is essentially returned to the preset position maintaining the highly desired memory feature such that the motor flow automatically and reliably returns to the preset position.

The system of FIG. 2 includes a manual control valve 65 connected directly between the trim-up input port or line 17 and the trim-down port or line 18 to the opposite side of the power cylinder units 10. The valve, when open equalizes pressure on both sides of the units bypassing all of the trim mechanism or trim actuator mechanism which permits the motor to be readily moved to either direction.

The present invention with the pressure responsive check valves has been found to provide a very reliable means of maintaining the trim-set position with automatic return thereto under impact conditions. Further, the trailing over feature maintains a very safe, shock absorbing construction.

Figure 5:
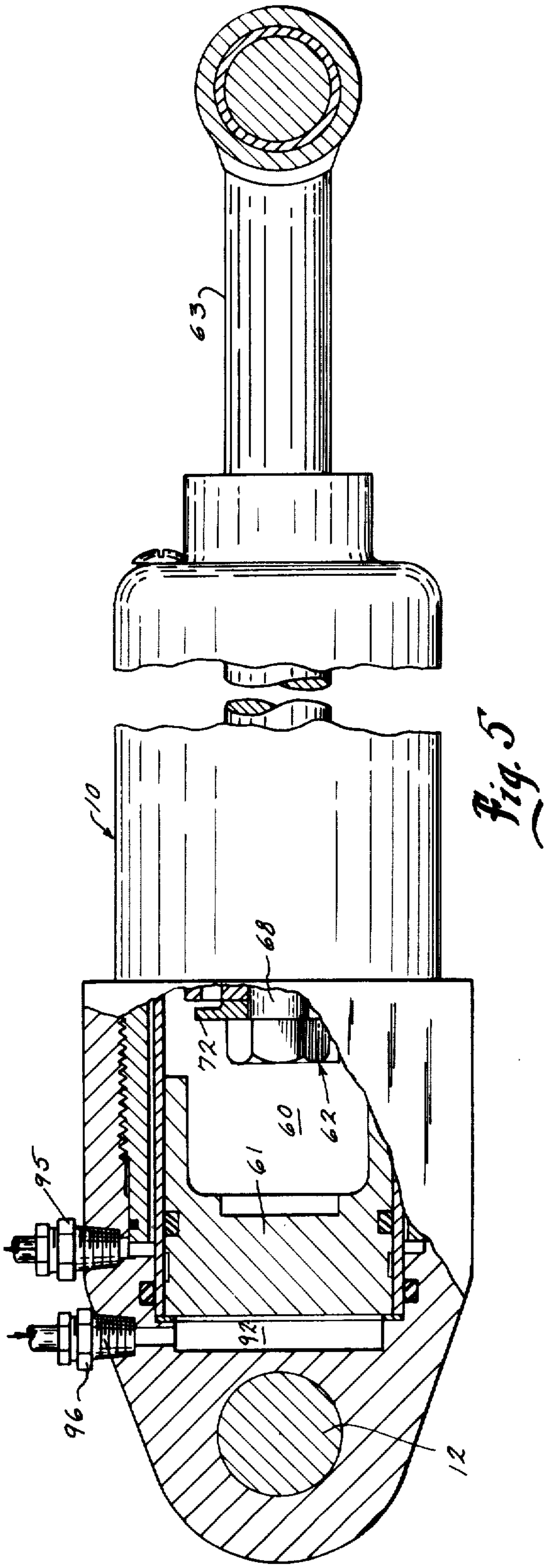
FIGS. 4 and 5 are similar sections through a piston-cylinder unit of FIG. 1 for both trimming and shock absorbing.
Figure 4:
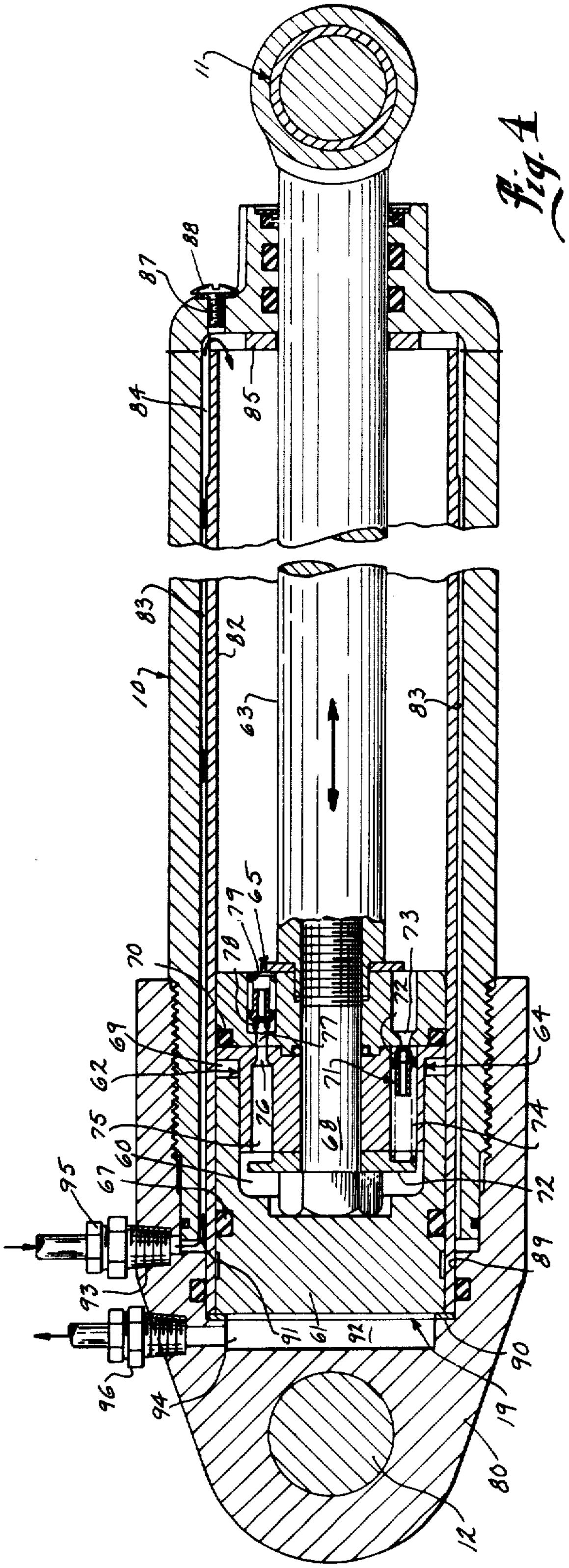

Referring particularly to FIGS. 4 and 5, a preferred construction of the piston-cylinder unit 10, particularly for the internal mounting within the bracket assemblies, is illustrated. the floating piston 61 is generally a free-floating, cup-shaped member which is sealed to the wall of the cylinder by a suitable O-ring seal 67. The rod piston member 62 is bolted to the inner end of the piston rod 62 as by a bolt 68 and is formed with an inner reduced diameter adapted to closely fit within the piston member 61. The outer flange portion of member 61 generally corresponds to the diameter of the cylinder. The depth of member 61 is such that the flanged portion is spaced slightly outwardly of the adjacent end of the piston member 61 in the fully collapsed position, as shown at 69 in FIG. 3. The piston member 62 is formed as an impact half portion clamped in abutting engagement to an outer return portion with an O-ring seal 70 secured at the interface.

The impact half of piston member 61 is formed with a tubular opening 71 extending axially and terminating in the outer end thereof. A washer 72 is secured to the piston end by bolt 68 and is recessed at the opening 71 to allow flow to the reservoir 60. An orifice 73 is formed in the outer return half of member 62 in alignment with opening 71. A ball check is located between the passageway or opening 70 and the orifice 73 with a coil spring 74 in opening 70 urging the valve closed.

The shock valve 64 is designed to open at a selected shock pressure encountered at high speed impact operation.

The opposite side of the piston is provided with the return valve assembly 65 with the washer 72 recessed for essentially free-flow into a return passageway 75 in the inner impact portion of member 62 and terminating in a small metering orifice 76 aligned with an orifice 77 in the return half of the shock piston 62. A spring loaded ball check 78 is secured abutting orifice 77 by a spring 79 which is designed for a metered return of fluid after the shock forces have dissipated and the motor weight tends to return the unit to the original position. This allows the motor and the associated shock piston unit to return to its preset trim position with the shock piston moving into the cup-shaped trim piston.

Although the shock valve and return valve arrangement have been heretofore employed, they normally employ spaced piston units. The telescoped arrangement with the cup-shaped floating piston further minimizes the overall working length of the unit, to increase the working stroke for the overall length and thereby further contributes to the satisfactory installation of the piston-cylinder unit into the transom-swivel bracket assemblies for an outboard motor.

The compact two-piece piston assembly with the special interconnecting valving has been found to provide a highly reliable trim and shock absorbing head which provides a long and satisfactory operating life.

The combined trim and shock absorbing piston-cylinder units 10 are preferably mounted within the side arms of the bracket assembly 3 as more fully disclosed in the copending application entitled HYDRAULIC POWERED TRIM AND TILT APPARATUS FOR MARINE PROPULSION DEVICES filed on the same day as this application and assigned to the same assignee.

As shown in FIGS. 4 and 5, piston-cylinder units 10 are connected to received and return hydraulic fluid to and from opposite sides of the piston unit 62. The lower end of the cylinder 10 is closed by a head 80 which threads thereon, while the upper end is formed with an integral end wall 81 within which piston rod 62 is slidably mounted. The cylinder 10 is a double wall assembly including an inner cylinder liner or jacket 82 spaced inwardly of the cylinder 10 to define a transfer passageway 83 between opposite ends of the cylinder unit. The outer wall 10 is formed with a plurality of circumferentially spaced side wall protrusions 84 which are machined to abut the outer wall of liner 82 to accurately locate the liner and define passageways 83 therebetween. The outer end of liner 82 abuts a washer 84 adjacent the inner surface of end wall 81. Washer 84 has peripheral slots 86 defining passageways from transfer passageway 83 to the cylinder chamber and particularly to the rod side thereof. A bleed opening 87 in end wall 81 is closed by a cap screw 88.

The lower or opposite end of liner 82 extends beyond the corresponding end of cylinder 10 within head 80 and into a corresponding shaped opening 89. Head 80 is threaded on cylinder 10 with the base edge 90 of opening 89 abutting the end of the cylinder liner 82 and with a washer therebetween. The base of the threaded portion is spaced from the end cylinder 10 to form a lateral annular passageway 91 to transfer passage 83 and the base of the liner opening is recessed to form a bottom inlet passageway 92 immediately adjacent the inner most position of the piston unit 62. The sidewall of the head 80 includes lateral or radial supply ports 93 and 94 aligned with passageways 93 and 94 and terminating at the end in threaded openings for receiving similar hose fittings 95 and 96 which are connected to the supply lines 17 and 18 of FIG. 1. The support ports 93 and 94 are thereby closely spaced to the cylinder chamber and the pivot bushing connection 12 is also closed spaced to the lower end.

The upper end of the cylinder unit 10 with the integral head wall 81 conjointly with the special ported lower head 80 thus minimizes the overall length of the cylinder unit 10 and creates a maximum operating or working stroke of piston unit 62 and rod 63. This is a particularly significant structure where the placement of combined power trim and shock absorbing means are to be placed within the mounted bracket assembly in order to establish a high satisfactory combined trim positioning and shock absorbing stroke of the units. This structure therefore provides a very compact assembly while maintaining reliable high powered positioning of the assembly. Further, the lower head construction permits a very convenient and protective connection of the hydraulic input/output lines. As disclosed in the previously identified application, the lower heads 80 of a pair of side-by-side units may be connected to a manifold unit 97 pivotally mounted on assembly 12 and connected to units 10 for pivoting therewith and having suitable conduits, not shown, connected to fittings 95 and 96.

Supply hoses or lines 17 and 18 each are similarly connected via hoses and bolts 15a to manifold 97 for conducting hydraulic liquid to and from the lower end of the piston cylinder units 12.

Various modes of carrying out the invention are contemplated as being within the scope of the following claims, particularly pointing out and distinctly claiming the subject matter which is regarded as the invention.

I claim:

1. In a combined trim and shock absorbing piston-cylinder apparatus comprising a cylinder having end closure walls at the opposite ends, means to supply hydraulic fluid to the opposite ends of said cylinder for oppositely positioning of a shock piston assembly and piston rod, said piston assembly comprising a shock piston slidably mounted within the cylinder with a sliding seal between the periphery of the piston and the cylinder, a piston rod being secured to the piston and extending out of one end of the cylinder, said shock piston having a valve means responsive to shock forces on said piston rod and cylinder to establish a shock absorbing fluid flow from one side to the opposite side of the piston, a trim piston unit located to the cylinder side of the shock piston and slidably sealed to the cylinder, said trim piston unit and shock piston being mounted in releasable telescoped relation to define a variable sized reservoir therebetween to the one side of the shock piston and minimizing the overall length of the piston assembly, whereby said shock piston and said trim piston unit can move together through abutment with one another or be spaced from one another.

2. In the apparatus of claim 1 wherein valve means of said shock piston assembly includes a shock resilient check valve means responsive to a selected pressure on the piston rod side of the piston assembly to open and allow a restricted flow into the reservoir between the shock piston and the trim piston unit, and a return check valve in said shock piston from said reservoir to the cylinder chamber to the piston rod side of the piston assembly.

3. The apparatus of claim 2 wherein said shock piston includes an inner impact portion and an outer return portion clamped to said impact portion, said shock check valve means being a ball check impact valve located within said impact portion and having a ball check resiliently abutting said return portion, said return portion having an axial inlet passageway aligned with said ball check, said return check valve being a ball check valve located in said return portion and having a ball check resiliently abutting a return orifice adjacent said impact portion, said impact portion having an axial opening aligned with said orifice.

4. In the apparatus of claim 1 wherein said trim piston unit is a cup-shaped member, and said shock piston is a cylindrical member having an inner cylindrical head portion telescoped into said cup-shaped member and an outer head portion corresponding to the diameter of said cup-shaped portion to form said reservoir between the shock piston and the trim piston unit, a return passageway in said shock piston unit from said reservoir to the cylinder chamber to the piston rod side of the piston assembly, said return passageway including an orifice, and said valve means including a check valve located in said passageway.

5. In the apparatus of claim 2 wherein said cylinder is a double wall cylinder defining a piston chamber and having an inner and outer wall means spaced to form a transfer passage between said wall means, one of said end closure walls defining a supply closure head secured to one end of the cylinder with an inner face adjacent the first end of the cylinder and having a first radial supply port connected to the transfer passage. The other of said end closure walls defining a second closure head mounted within the outer end of the cylinder, lateral passages between the transfer passageway and the piston chamber at the inner face of said second closure head, a second radial supply port in said supply closure head having a lateral passage at the inner face of said supply closure head.

6. In the apparatus of claim 5 wherein said cylinder has parallel opposite ends and is closed at the opposite ends by said closure heads, said heads having essentially flat inner faces and having side wall port means supplying liquid radially into the cylinder adjacent said inner faces, whereby said piston stroke is extended.

7. In the apparatus of claim 5 wherein said cylinder has said supply head telescoped over the lower end of said double wall cylinder portion, said first supply port is connected in the side of said head and terminating in said transfer passage, said second supply port connected in the side of said head inwardly of the inner face of the closure head and terminating in the lower end of said cylinder chamber.

* * * * *